April 22, 1952
A. E. CLARKE ET AL
LIQUID FUEL BURNER WITH DIVERSE
AIR PATHS AND FUEL VAPORIZER
Filed July 11, 1949
2,593,849
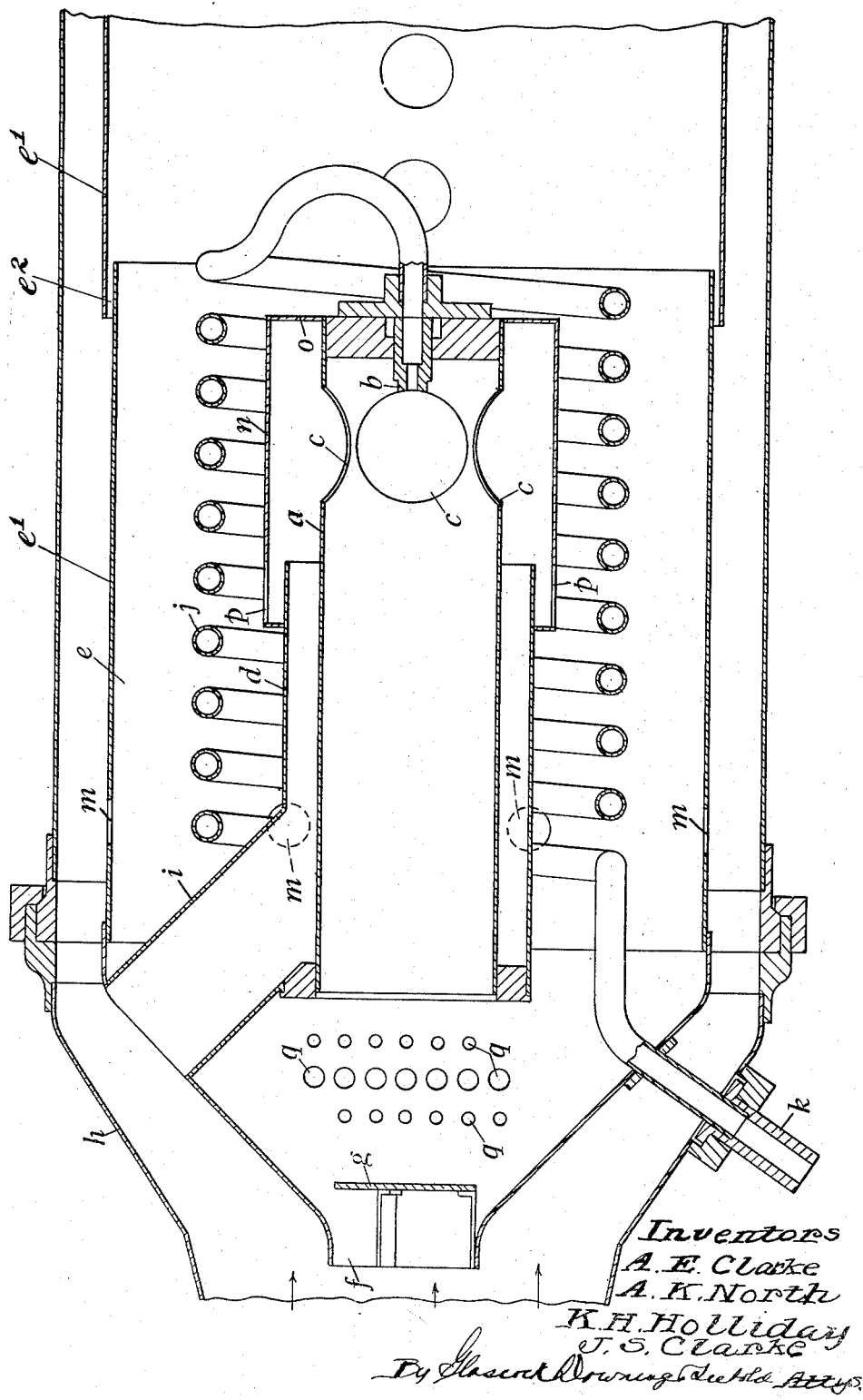
Inventors
A. E. Clarke
A. K. North
K. H. Holliday
J. S. Clarke Patented Apr. 22, 1952

2,593,849

UNITED STATES PATENT OFFICE 2,593,849

LIQUID FUEL BURNER WITH DIVERSE AIR PATHS AND FUEL VAPORIZER

Albert Edward Clarke and Allan Kingdon North, Brierfield, Burnley, and Kenneth Hedley Holliday and John Stanley Clarke, Burnley, England, assignors to Joseph Lucas Limited, Birmingham, England Application July 11, 1949, Serial No. 104,112
In Great Britain July 13, 1948

2 Claims. (Cl. 60—39.65)

This invention has for its object to provide an improved liquid fuel burner adapted for use more particularly with gas turbines or jet-propulsion engines.

An object of the invention is to enable the energy of the injected fuel to be utilised to promote air flow, and to ensure proper mixing of the fuel and air.

Another object of the invention is to enable the fuel-air ratio to be controlled automatically by variations in the energy of the injected fuel.

A further object of the invention is to enable the air to be preheated more effectively than heretofore.

The accompanying drawing is a sectional side elevation illustrating one embodiment of the invention.

Referring to the drawing there is employed a mixing tube $a$ of appropriate length and diameter and closed at one end, and on the closed end of this tube is mounted the vapour injection nozzle $b$. Adjacent to the nozzle the said tube is provided with apertures $c$ adapted to admit primary air to the mixing tube, which air is supplied from a primary air tube $d$ surrounding the mixing tube. The two tubes $a$, $d$, are mounted coaxially within a tubular combustion chamber $e$ with the discharge end of the mixing tube in the principal combustion zone, the combustion chamber being composed of coaxially arranged hollow cylindrical sections $e^1$ which at their adjacent ends form between them openings $e^2$ for tertiary air.

The entrance end of the combustion chamber is shaped as shown and is partially closed, excepting for the axial opening $f$ through which air can enter and flow past the periphery of the baffle $g$. In this end are also formed perforations $q$ for the admission of supplementary air from the jacket $h$ surrounding the combustion chamber $e$. For the admission of air from the jacket $h$ to the primary air tube $d$ the latter is provided with a branch connection $i$ or connections, opening into the said tube at the end remote from the end at which air passes into the mixing tube $a$. For vaporising the liquid fuel, a helically coiled pipe $j$ or other equivalent means is mounted around the primary air tube, with one end connected to the nipple and the other end extending to a supply pipe connection $k$ carried by the air jacket, the liquid being vaporised by heat derived from the hot gases in the combustion chamber.

The combustion chamber may be provided with any suitable number of holes $m$ situated as shown for admitting secondary air from the jacket.

Also there is preferably arranged around the mixing tube $a$ adjacent to the apertures $c$ a shield $n$ having a closed end at $o$. The shield is provided with openings as $p$ to allow excess air to pass into the combustion chamber. The purpose of the shield is to arrest the flow of air flowing along the duct $d$ to the vicinity of the holes $c$ and so ensure an ample flow of air through the apertures $c$ into the mixing tube $a$.

By this invention we are able to meet a variety of requirements in a satisfactory manner. Thus, a rich combustible mixture can be ensured under low-load conditions, and a desirable cool core can be maintained in the principal combustion zone.

Having thus described our invention what we claim as new and desire to secure by Letters Patent is:

1. A liquid fuel burner comprising in combination, a liquid fuel vaporiser, a mixing tube having one end closed and the other open, a vapour injection nozzle mounted on the closed end of said mixing tube and connected to said vaporiser, said mixing tube being provided with air-admission apertures adjacent to said nozzles, a primary air tube surrounding said mixing tube and having at least one air entrance at the end remote from the closed end of said mixing tube, and an air-jacketed combustion chamber in which the primary air and mixing tubes are coaxially mounted, and which at the end adjacent to the air entrance of said primary air tube forms a principal combustion zone, the open end of said mixing tube being situated in said zone, and said fuel vaporiser being mounted in said combustion chamber around said primary and mixing tubes so that said vaporiser can be heated by gases from said principal combustion zone.

2. A liquid fuel burner as claimed in claim 1 and having a shield surrounding the part of the mixing tube provided with the air-admission apertures.

ALBERT EDWARD CLARKE.
ALLAN KINGDON NORTH.
KENNETH HEDLEY HOLLIDAY.
JOHN STANLEY CLARKE.

REFERENCES CITED

The following references are of record in the file of this patent:

UNITED STATES PATENTS

| Number | Name | Date |
|---|---|---|
| 987,158 | Neilson | Mar. 21, 1911 |
| 1,757,855 | Chilowsky | May 6, 1930 |
| 2,446,059 | Peterson et al. | July 27, 1948 |